W. G. PARMELE.
MILK PAIL.
APPLICATION FILED JUNE 13, 1916.

1,221,583.

Patented Apr. 3, 1917.

WITNESSES
Edw. Thorpe
J. E. Larsen

INVENTOR
W. G. Parmele
BY Munn & Co
ATTORNEYS

UNITED STATES PATENT OFFICE.

WILLIAM G. PARMELE, OF CHETOPA, KANSAS.

MILK-PAIL.

1,221,583.     Specification of Letters Patent.     Patented Apr. 3, 1917.

Application filed June 13, 1916. Serial No. 103,450.

*To all whom it may concern:*

Be it known that I, WILLIAM G. PARMELE, a citizen of the United States, and a resident of Chetopa, in the county of Labette and State of Kansas, have invented certain new and useful Improvements in Milk-Pails, of which the following is a specification.

My invention relates to milk pails for use in milking cows, and the main object thereof is to provide such a pail which minimizes the possibility of dirt entering the milk, as from the switching of the cow's tail, which prevents the milk from reaching the milker, which is convenient for carriage, which serves as a seat for the milker, which is very simple in construction, highly efficient in use, and thoroughly practical, and which is comparatively inexpensive.

My invention is full described in the following specification, of which the accompanying drawings form a part, in which like characters refer to like parts in each of the views, and in which:—

Figure 1:
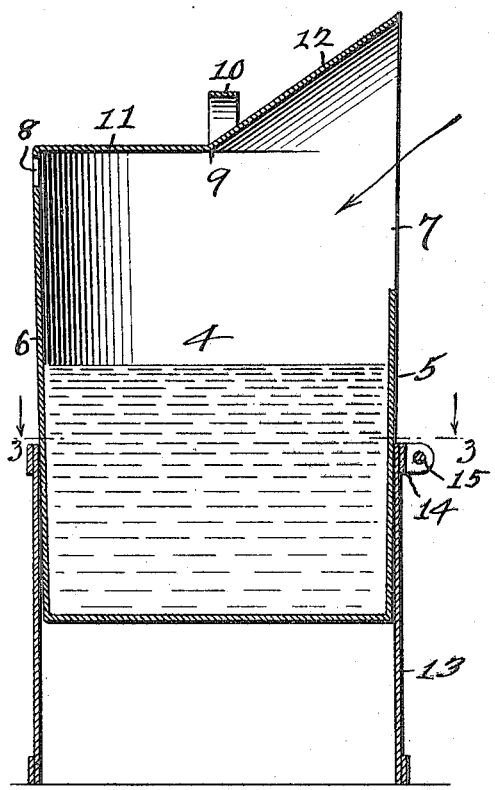
Figure 1 is a vertical section taken through a pail constructed in accordance with my invention, taken on the line 1—1 of Fig. 2.
Figure 2:
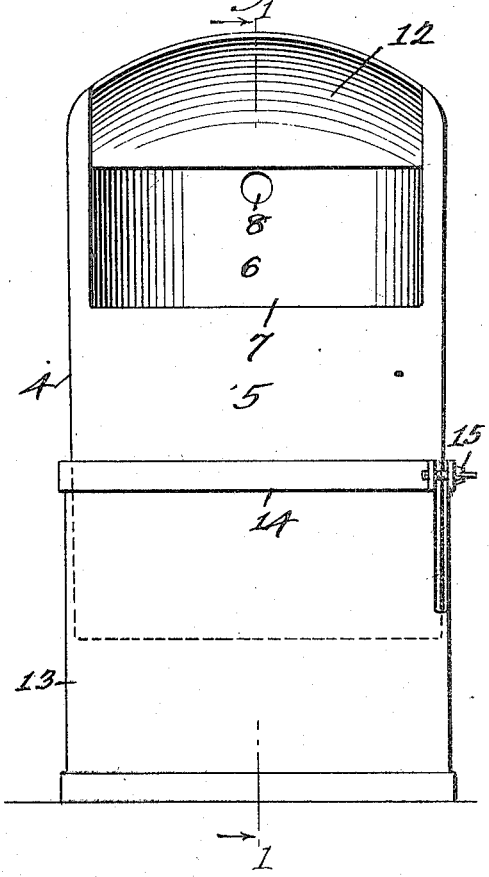
Fig. 2 is a front view thereof.
Figure 3:
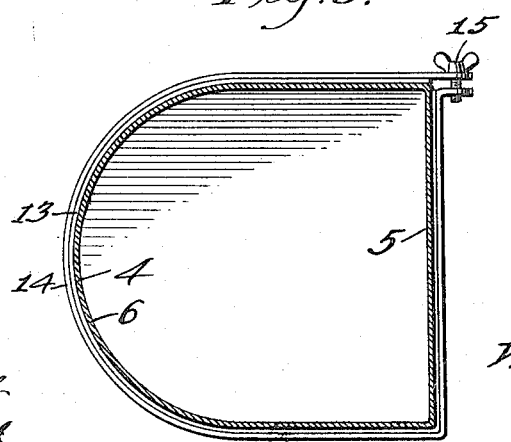
Fig. 3 is a section taken on the line 3—3 of Fig. 1.

My invention comprises a pail 4 of substantially semicircular form in plan to provide a flat side 5 which extends upwardly above the curved rear 6 and is provided with an opening 7 at its top, said rear wall being provided with a relatively small orifice 8 adjacent the top thereof.

The pail is closed at its top, as shown at 9 and is provided with a stationary handle 10, the closed top 9 being horizontal for a portion of its surface, as shown at 11, to provide a seat for a milker, and is upwardly and forwardly inclined for the rest of its surface, as shown at 12, to join with the top edge of the flat side 5.

The pail 4 may, if desired, be provided with a false, inclosing, lower end 13 of the approximate size of the exterior of said pail in turn provided with a band 14 the ends of which are clamped together by means of a thumb-screw 15. When this screw 15 is loosened, the pail may be vertically adjusted to adapt the same to a particular cow, after which the screw is again tightened and the pail and support 13 constitute a unit the support 13 forming no part, however, of the present invention.

In practice, the milker places the opening 7 adjacent the teats of the cow and seats himself upon the top portion 11, straddling the pail, after which he directs the streams of milk through the opening 7 without danger of any dirt entering the pail and without danger of soiling his clothes. When it is desired to empty the pail the milk is poured through the opening or orifice 8 which is made small so that the milk may be poured into small mouthed receptacles, if desired.

When the pail is to be carried, as from cow to cow or to the dairy, the open side 5 may be carried to the rear and thus prevent any dirt from blowing into the milk, the latter thus being maintained in a sanitary condition.

Having fully described my invention, what I claim as new, and desire to secure by Letters Patent, is:—

A milk pail provided with a flat vertical side having a filler opening therein and with a closed top composed of a horizontal seat member and a member inclined upwardly to meet said vertical side above said filler opening.

In testimony whereof I have signed my name to this specification in the presence of two subscribing witnesses.

WILLIAM G. PARMELE.

Witnesses:
    FRANK C. BRIDGEFORD,
    DEL. GILBO.

Copies of this patent may be obtained for five cents each, by addressing the "Commissioner of Patents, Washington, D. C."